US012681592B2

(12) United States Patent
Akimoto et al.

(10) Patent No.: US 12,681,592 B2
(45) Date of Patent: Jul. 14, 2026

(54) ELECTRONIC APPARATUS

(71) Applicant: CANON KABUSHIKI KAISHA,
Tokyo (JP)

(72) Inventors: Takahiro Akimoto, Kanagawa (JP);
Yoshitaka Hashimoto, Kanagawa (JP);
Taro Fuchigami, North Point (HK);
Haruhisa Ueda, Kanagawa (JP);
Nagisa Yanagibashi, Kanagawa (JP);
Takayuki Iwasa, Kanagawa (JP)

(73) Assignee: Canon Kabushiki Kaisha, Tokyo (JP)

(*) Notice: Subject to any disclaimer, the term of this
patent is extended or adjusted under 35
U.S.C. 154(b) by 244 days.

(21) Appl. No.: 18/403,506

(22) Filed: Jan. 3, 2024

(65) Prior Publication Data

US 2024/0143091 A1 May 2, 2024

Related U.S. Application Data

(63) Continuation of application No.
PCT/JP2022/015802, filed on Mar. 30, 2022.

(30) Foreign Application Priority Data

Jul. 5, 2021 (JP) ................................. 2021-111734

(51) Int. Cl.
*G06F 3/0362* (2013.01)
*G06F 3/0354* (2013.01)
(Continued)

(52) U.S. Cl.
CPC ........ *G06F 3/0362* (2013.01); *G06F 3/03547*
(2013.01); *G06F 3/0383* (2013.01); *H04N*
*23/62* (2023.01)

(58) Field of Classification Search
CPC .. G06F 3/0362; G06F 3/03547; G06F 3/0383;
G06F 3/04883; G06F 3/044;
(Continued)

(56) References Cited

U.S. PATENT DOCUMENTS

| | | |
|---|---|---|
| 2014/0002362 A1 | 1/2014 | Srivastava |
| 2016/0224133 A1 | 8/2016 | Perret-Gentil |
| 2019/0094811 A1* | 3/2019 | Guo ...................... G04C 3/004 |

FOREIGN PATENT DOCUMENTS

| | | | |
|---|---|---|---|
| JP | 5882721 B2 | 3/2016 | |
| JP | 2016054074 * | 4/2016 | ............. H01H 25/04 |

(Continued)

OTHER PUBLICATIONS

US Publication Nos, 1-2 and Foreign Reference Nos. 3-4 were cited
the International Search Report of International Application No.
PCT/JP2022/015802 issued on Jun. 21, 2022, which is enclosed.

(Continued)

*Primary Examiner* — Ahmed M Saeed
(74) *Attorney, Agent, or Firm* — Cowan, Liebowitz &
Latman, P.C.

(57) ABSTRACT

An electronic apparatus includes an operation member that
is rotationally operable, a rotation detection substrate pro-
vided with a rotation detector configured to detect rotation of
the operation member, a capacitance detector provided
inside the operation member and configured to output a
detection signal in accordance with capacitance, a signal
transfer unit configured to transfer the detection signal to the
rotation detection substrate, and a touch operation detector
to which the detection signal is input through the rotation
detection substrate, the touch operation detector being con-
figured to detect a tap operation and a slide operation as a
touch operation onto an outer surface of the operation
member based on change in the detection signal due to the
touch operation.

12 Claims, 12 Drawing Sheets

(51) Int. Cl.
    *G06F 3/038*        (2013.01)
    *H04N 23/62*        (2023.01)

(58) Field of Classification Search
    CPC ........ H04N 23/62; G03B 17/02; H01H 19/00;
                                  H01H 36/00
    See application file for complete search history.

(56)                    References Cited

FOREIGN PATENT DOCUMENTS

| JP | 2016-206930 A | 12/2016 |
|----|---------------|---------|
| JP | 2017-027284 A | 2/2017 |
| JP | 6676807 B2 | 4/2020 |

OTHER PUBLICATIONS

Jan. 18, 2024 PCT/IB/338 (PCT Notification of Transmittal of Translation of the International Preliminary Report on Patentability) from International Application No. PCT/JP2022/015802.
Jan. 18, 2024 PCT/IB/373 (PCT International Preliminary Report on Patentability) from International Application No. PCT/JP2022/015802.
Jan. 18, 2024 PCT/ISA/237 (PCT Written Opinion of the International Searching Authority) from International Application No. PCT/JP2022/015802.

* cited by examiner

1101

1102b

1102c

600

ELECTRONIC APPARATUS

CROSS-REFERENCE TO RELATED APPLICATIONS

This application is a Continuation of International Patent Application No. PCT/JP2022/015802, filed on Mar. 30, 2022, which claims the benefit of Japanese Patent Application No. 2021-111734, filed on Jul. 5, 2021, which is hereby incorporated by reference herein in their entirety.

BACKGROUND

Technical Field

One of the aspects of the embodiments relates to an electronic apparatus including an operation unit operated by a user.

Description of Related Art

Japanese Patent No. 6676807 discloses, as an electronic apparatus described above, an image pickup apparatus including a dial on which a rotational operation can be performed and a touch operation unit that can be subjected to a tap operation and a slide operation. In this image pickup apparatus, sound generation can be prevented through an operation of the touch operation unit by a user during moving image capturing, and a stable operation feeling due to a click mechanism can be obtained through an operation of the dial during finder observation or the like.

Japanese Patent No. 5882721 discloses an electronic apparatus (image pickup apparatus) in which a capacitance detector configured to detect capacitance change is provided at the dial to enable a rotational operation and a touch operation onto the operation member.

However, in the image pickup apparatus disclosed in Japanese Patent No. 6676807, the dial and the touch operation unit are separately provided, which may prevent the image pickup apparatus from being miniaturized.

In the electronic apparatus disclosed in Japanese Patent No. 5882721, a rotational operation and a touch operation onto one operation member are enabled, but clearance including an air layer is provided between the surface of the operation member touched by the user in a touch operation and the capacitance detector. Thus, a signal output from the capacitance detector is unstable depending on the way of touch by the user, and a touch operation (slide operation, in particular) cannot be accurately detected in some cases.

SUMMARY

An electronic apparatus according to one aspect of the embodiment includes an operation member that is rotationally operable, a rotation detection substrate provided with a rotation detector configured to detect rotation of the operation member, a capacitance detector provided inside the operation member and configured to output a detection signal in accordance with capacitance, a signal transfer unit configured to transfer the detection signal to the rotation detection substrate, and a touch operation detector to which the detection signal is input through the rotation detection substrate, the touch operation detector being configured to detect a tap operation and a slide operation as a touch operation onto an outer surface of the operation member based on change in the detection signal due to the touch operation.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1A:
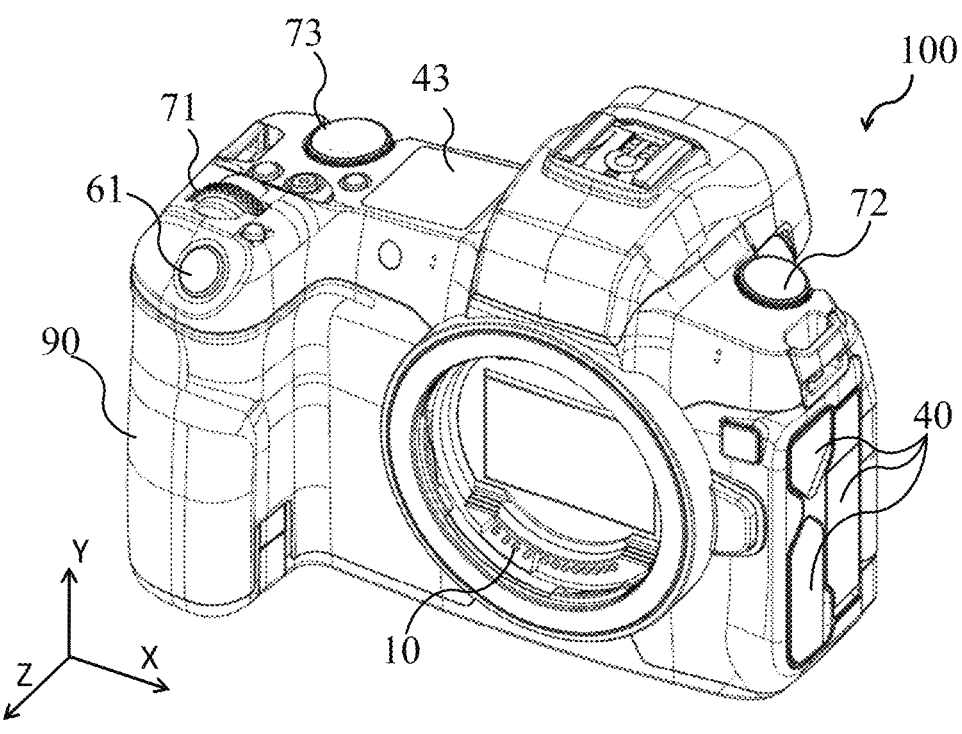
FIGS. 1A and 1B are exterior diagrams of a digital camera according to an example.
Figure 1B:
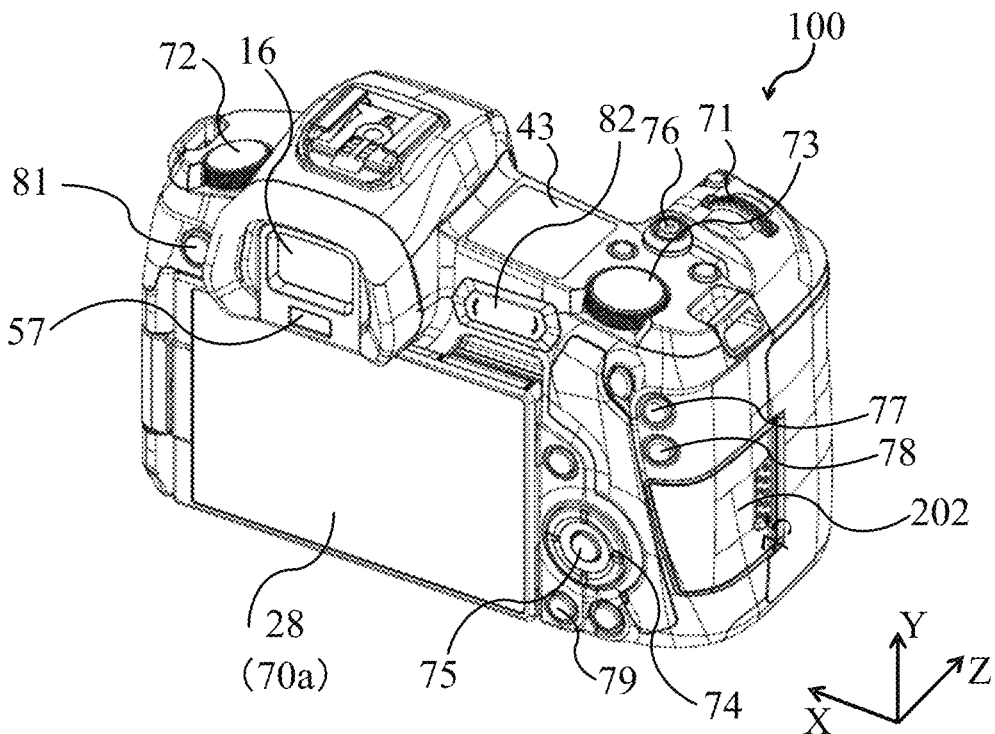
Figure 2:
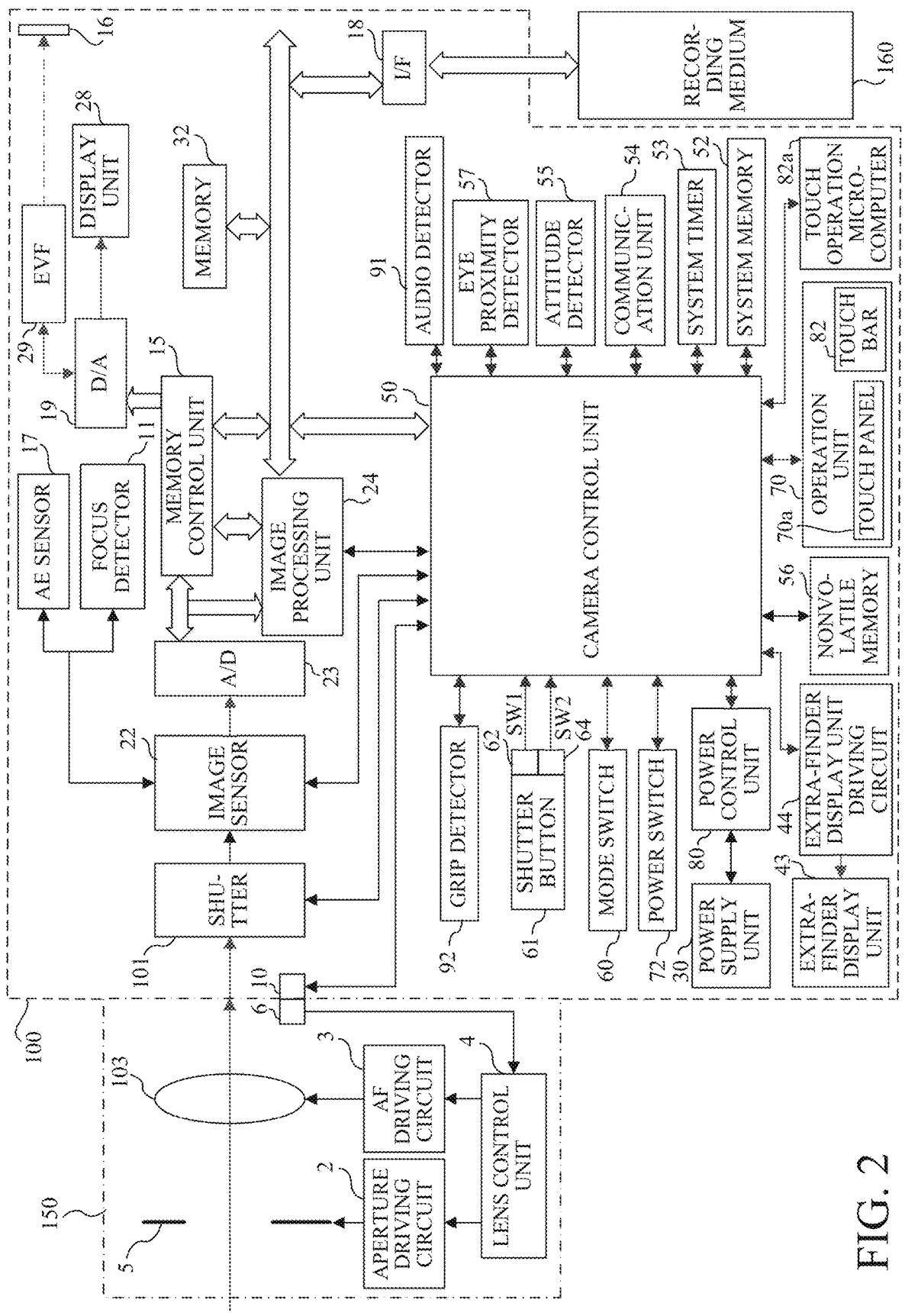
FIG. 2 is a block diagram illustrating the configuration of the digital camera according to the example.

Illustrative embodiments will be described below with reference to the accompanying drawings. FIGS. 1A and 1B illustrate the front-surface-side appearance and back-surface-side appearance, respectively, of a lens interchangeable digital camera (simply referred to as a camera hereinafter) 100 as an electronic apparatus according to one example of the disclosure. FIG. 2 illustrates the internal configurations of the camera 100 and a lens unit (interchangeable lens) 150 mounted on a mount unit.

A display unit 28 provided on the back surface of the camera 100 includes an LCD panel, an organic EL panel, or the like and displays a live-view image, captured images (still and moving images), and various kinds of information including a menu screen. A touch panel 70a is provided on a display surface (operation surface) of the display unit 28 and can detect a touch operation onto the display surface by a user. The touch panel 70a is included in an operation unit 70 illustrated in FIG. 2. An extra-finder display unit 43 is provided at an upper surface of the camera 100 and displays setting values of shutter speed, an aperture value (F-number), and the like.

A power switch 72 is operated by the user to power on and off the camera 100. A mode switch 60 illustrated in FIG. 2 is operated by the user to switch various modes such as a still image capturing mode, a moving image capturing mode, and a playback mode.

The still image capturing mode includes an automatic imaging mode, an automatic scene determination mode, a manual mode, an aperture prioritized mode, a shutter speed prioritized mode, and a programmed AE mode. The user can select any of these modes through an operation of the mode switch 60. A selection screen for the above modes may be displayed on a menu screen so that either mode can be selected through an operation of an operation member (for example, a sub electronic dial unit 73 to be described below) other than the mode switch 60. Similarly, the moving image capturing mode includes a plurality of modes and either mode can be selected in the same manner as the still image capturing mode.

A shutter button 61 is operated by the user to instruct still image capturing in the still image capturing mode. A first shutter switch 62 and a second shutter switch 64 illustrated in FIG. 2 are turned on by a halfway press operation and a full press operation, respectively, of the shutter button 61. A camera control unit 50 as a control unit illustrated in FIG. 2 controls image capturing preparation operation, which includes auto-exposure (AE) and autofocus (AF), in accordance with turn-on of the first shutter switch 62 (inputting of a signal SW1). The camera control unit 50 performs still image capturing in accordance with turn-on of the second shutter switch 64 (inputting of a signal SW2).

The operation unit 70 illustrated in FIG. 2 includes a main electronic dial unit 71 and the sub electronic dial unit 73 illustrated in FIGS. 1A and 1B in addition to the touch panel 70a. The operation unit 70 also includes a directional pad 74, a set button 75, a motion image button 76, an AE lock button 77, a magnification button 78, a playback button 79, a menu button 81, and a touch bar 82.

The main electronic dial unit 71 and the sub electronic dial unit 73 each include a dial as an operation member that can be subject to a rotational operation by the user. Through a rotational operation onto the dial of the main electronic dial unit 71, the setting values of the shutter speed, the aperture value, or the like can be changed. Through a rotational operation onto the dial of the sub electronic dial unit 73, a selected region of an AE region, an AF region, or the like can be moved or image feed can be performed to switch images displayed on the display unit 28.

The directional pad 74 is a four-directional key with an upper part, a lower part, a left part, and a right part that can be each subject to a press-down operation, the four-directional key. An item can be switched or selected in accordance with a part of the directional pad 74 subjected to a press-down operation by the user while a menu screen is displayed on the display unit 28. The set button 75 is operated by the user for determination of a selected item or the like.

The motion image button 76 is operated by the user to instruct start or stop of moving image capturing (recording) in the moving image capturing mode. The AE lock button 77 is operated by the user to fix exposure in an image capturing wait state. The magnification button 78 is operated by the user to turn on or off a magnification mode while a live-view image is displayed. After the magnification mode is turned on, the live-view image can be scaled up or down by operating the main electronic dial unit 71. A captured image displayed in playback can be magnified or the magnification can be increased by operating the magnification button 78 in the playback mode.

The playback button 79 is operated by the user to switch between a still-image/moving-image capturing mode and the playback mode. In a case where the playback button 79 is operated in the still-image/moving-image capturing mode, transition to the playback mode occurs and the latest image among captured images recorded in a recording medium 160 can be displayed on the display unit 28. The menu button 81 is operated by the user to display a menu screen on the display unit 28.

The touch bar 82 is a linear touch operation member (line touch sensor) configured to receive a touch operation by the user and provided separately from the touch panel 70a. The user can perform, as a touch operation onto the touch bar 82, a tap operation (operation of touching with a finger and then removing the finger without changing a touch position in a predetermined time) or a slide operation (operation of touching with a finger and then moving the finger while touching) in the right-left direction. The touch bar 82 in this example is a capacitive touch sensor. However, the touch bar 82 may be a touch sensor of another scheme such as a resistance film scheme, a surface acoustic wave scheme, an infrared scheme, an electromagnetic induction scheme, an image recognition scheme, or a light sensor scheme.

The touch bar 82 outputs a detection signal (hereinafter referred to as a capacitance signal) in accordance with capacitance to a touch operation microcomputer 82a. The capacitance signal from the touch bar 82 changes as the user touches (performs a touch operation onto) the touch bar 82. The touch operation microcomputer 82a determines (detects), based on the change in the capacitance signal, which of a tap operation, a slide operation in the right direction (referred to as a right slide operation hereinafter), and a slide operation in the left direction (hereinafter referred to as a left slide operation) is performed among touch operations to the touch bar 82. Then, the touch operation microcomputer 82a outputs a result of the determination to the camera control unit 50. The camera control unit 50 performs change in various setting values or the like in accordance with the above program and the kind of the touch operation input from the touch operation microcomputer 82a.

As illustrated in FIGS. 1A and 1B, a grip portion 90 is a part gripped by the user with the right hand to hold the camera 100. The shutter button 61 and the main electronic dial unit 71 are disposed at positions where an operation with the forefinger of the right hand is possible while the grip portion 90 is gripped with the little finger, the ring finger, and the middle finger of the right hand, and the sub electronic dial unit 73 and the touch bar 82 are disposed at positions where an operation with the thumb of the right hand is possible.

A grip detector 92 illustrated in FIG. 2 is a sensor configured to detect gripping of the grip portion 90 by the user and is, for example, a capacitive touch sensor or a pressure-sensitive sensor (piezoelectric element). The camera control unit 50 performs, for example, control to enable or disable some operation members included in the operation unit 70 in accordance with detection or non-detection by the grip detector 92.

An audio detector 91 is a microphone configured to detect sound. The camera control unit 50 records sound detected by the audio detector 91 in an internal memory or the recording medium 160 with a captured image.

An attitude detector 55 is a sensor configured to detect the attitude (position) and motion of the camera 100 and is, for example, an acceleration sensor or a gyro sensor. The camera control unit 50 controls the orientation of a live-view image or a captured image in accordance with the attitude or motion detected by the attitude detector 55.

An eyepiece 16 is a part viewed by the user looks to see an electronic viewfinder (EVF) 29. The user can see an image or information displayed at the EVF 29 through the eyepiece 16. An eye proximity detector 57 is a sensor configured to detect viewing (eye proximity) of the eyepiece 16 by the user with the face (eye) being close to the eyepiece 16 and is, for example, an infrared proximity sensor. The camera control unit 50 displays the display unit 28 but does not display the EVF 29 while eye proximity is not detected by the eye proximity detector 57, or does not display the display unit 28 but displays the EVF 29 while eye proximity is detected.

A communication terminal 10 is provided in the mount unit for the camera 100 to perform communication with a lens unit 150. A terminal cover 40 is a member protecting an unillustrated connector that is connected to a cable connecting the camera 100 to an external instrument. A lid 170 is a member that closes a slot in which the recording medium 160 is stored.

In FIG. 2, the lens unit 150 includes an image pickup optical system constituted by a plurality of lenses (illustrated as one lens in the diagram) 103 and an aperture stop 1.

An image sensor 22 in the camera 100 includes a CCD sensor, a CMOS sensor, or the like and converts an optical image formed through the image pickup optical system into an electric signal. A shutter 101 is a mechanical shutter (focal plane shutter) configured to control an exposure time of the image sensor 22.

An AE sensor 17 detects the luminance of an object by using an output signal (luminance signal) from the image sensor 22. A focus detector 11 detects a defocus amount by using an output signal (focus detection signal) from the image sensor 22. The camera control unit 50 controls the opening diameter (aperture value) of the aperture stop 1 and the shutter speed based on luminance information from the AE sensor 17 and performs AF control based on defocus amount information from the focus detector 11.

An A/D converter 23 converts an analog image signal from the image sensor 22 into a digital image signal (image capturing data) and outputs the image capturing data to an image processing unit (processing unit) 24 and a memory control unit 15. The image processing unit 24 generates image data by providing the image capturing data from the A/D converter 23 with image processing such as pixel interpolation, resize processing, color conversion processing, and auto-white balance (AWB) processing. The image data is written to a memory 32 through the memory control unit 15 or directly. AD/A converter 19 receives the image data stored in the memory 32 through the memory control unit 15, converts the image data into an analog image signal, and supplies the image data to the display unit 28 and the EVF 29 to display a live-view image.

An extra-finder display unit driving circuit 44 causes on the extra-finder display unit 43 to display various above-described setting values.

A nonvolatile memory 56 is an electrically erasable and recordable memory and is, for example, an EEPROM. The nonvolatile memory 56 stores constants, computer programs, and the like for operation of the camera control unit 50. The camera control unit 50 is a computer constituted by a processor and a peripheral circuit and controls the entire operation of the camera 100 and the lens unit 150 by executing a computer program stored in the nonvolatile memory 56 and loaded onto a system memory 52 such as a RAM.

A system timer 53 measures a time used for various kinds of control performed by the camera control unit 50 and the time of a built-in clock.

A power control unit 80 includes a battery detection circuit, a DC-DC converter, and a switch circuit configured to switch blocks to be energized. The battery detection circuit detects whether a battery is mounted, the kind of the battery, and the remaining amount of the battery. The power control unit 80 and controls the DC-DC converter and the switch circuit based on the remaining amount of the battery and an instruction from the camera control unit 50 and supplies needed voltage to blocks including the recording medium 160 for a needed duration.

A power supply unit 30 includes a primary battery such as an alkaline battery or a lithium battery, a secondary battery such as a NiCd battery, a NiMH battery, or a Li battery, or an AC adapter. A recording medium OF 18 is an interface to the recording medium 160 such as a semiconductor memory card or a hard disk. A communication unit 54 is connected wirelessly or through a wired cable and transmits and receives image and sound signals.

The communication unit 54 performs communication of a captured image, a live-view image, or other information with an external instrument through a wireless LAN, the Internet, Bluetooth (registered trademark), Bluetooth Low Energy (registered trademark), or the like.

In the lens unit 150, a communication terminal 6 is provided for a lens control unit 4, which is provided in the lens unit 150, to perform communication with the camera control unit 50 through the communication terminal 10 on the camera side. The camera control unit 50 performs AF by driving the aperture stop 1 through control of an aperture driving circuit 2 through the lens control unit 4 and driving the lenses (focus lenses) 103 through control of an AF driving circuit 3.

The sub electronic dial unit 73 in this example will be described below in more detail. The sub electronic dial unit 73 can receive not only a rotational operation onto the dial but also the same touch operations (a tap operation, a right slide operation, and a left slide operation) as the touch bar 82 on an outer circumferential surface (outer surface) that is a side surface of the dial about the rotational center. The tap operations also include a tap operation in a right tap range (hereinafter referred to as a right tap operation) on the right side (first side) and a tap operation in a left tap range (hereinafter referred to as a left tap operation) on the left side (second side opposite the first side) on the outer circumferential surface of an operable portion of the dial to be described below.

A touch operation onto the outer circumferential surface of the dial is detected by a capacitive touch sensor (hereinafter referred to as a dial touch sensor) provided on the inner circumferential surface (inner surface) of the dial. Similarly to the touch bar 82, the dial touch sensor outputs a capacitance signal that is a detection signal in accordance with capacitance to the touch operation microcomputer 82a as a touch operation detector.

As the user performs a touch operation onto the outer circumferential surface of the dial, the capacitance at the dial touch sensor changes and the capacitance signal output from the dial touch sensor changes. The change in the capacitance at the dial touch sensor due to the touch operation may be increase or decrease, but a case of the increase will be described below.

The touch operation microcomputer 82a determines which of a right tap operation, a left tap operation, a right slide operation, and a left slide operation is performed on the dial based on the change in the capacitance signal from the dial touch sensor, and outputs a result of the determination (the kind of the touch operation) to the camera control unit 50. The camera control unit 50 performs change and the like of various setting values in accordance with the kind of the touch operation input from the touch operation microcomputer 82a. The camera control unit 50 also performs the above-described selected region movement or image feed in accordance with a rotational operation onto the dial.

The kind of the touch operation may be determined by inputting the capacitance signal from the dial touch sensor to a microcomputer different from the touch operation microcomputer 82a to which the capacitance signal from the touch bar 82 is input.

The sub electronic dial unit 73, which can receive a rotational operation and a touch operation onto one dial, is provided for the following reason. For example, in performing a rotational operation onto the dial to perform still image capturing while viewing into the eyepiece 16, the user obtains a click feeling (operation feeling) due to a click mechanism in the sub electronic dial unit 73 and thus can perform a stable operation without viewing the dial. However, sound (click sound) is generated from the click mechanism due to the rotation of the dial. The sound generation can be prevented by performing a touch operation onto the dial at moving image capturing.

In this example, the touch bar 82 on which a touch operation is possible is provided separately from the sub electronic dial unit 73 on which a touch operation is possible, but the touch bar 82 may be omitted.

EXAMPLE 1

Figure 3:
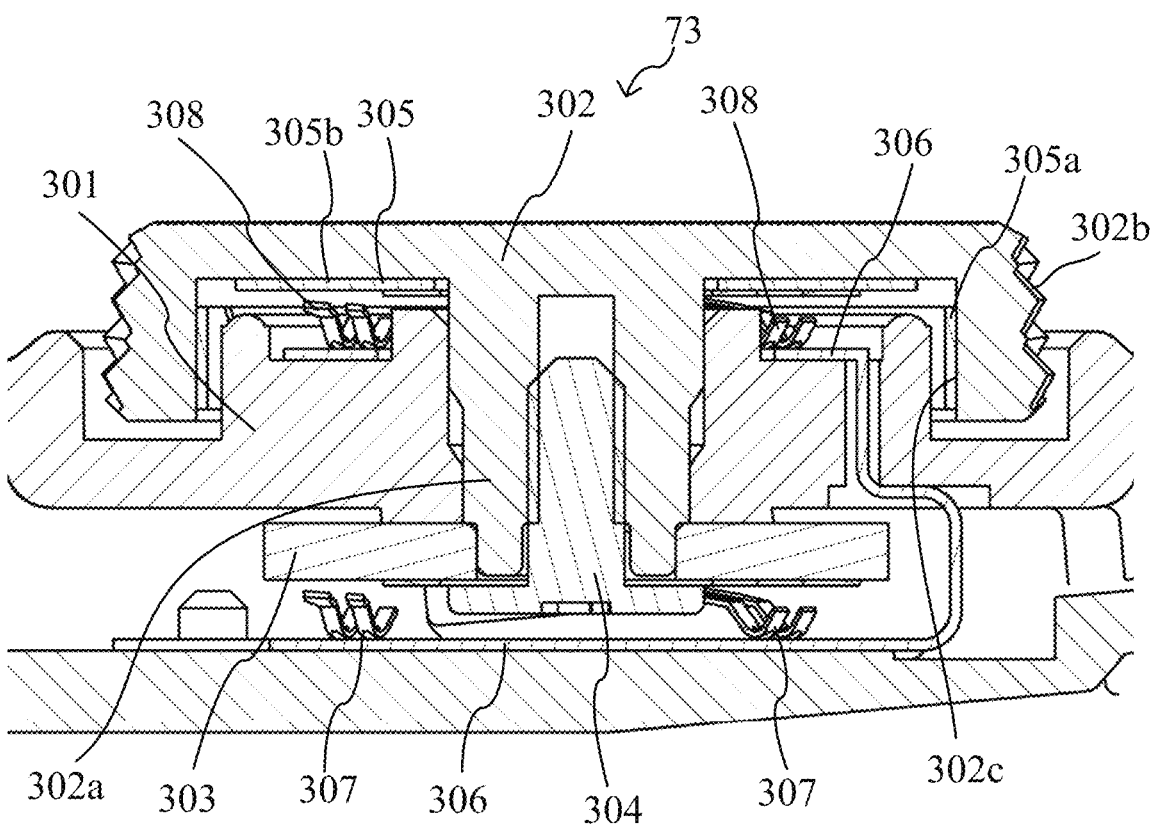
FIG. 3 is a sectional view of a sub electronic dial unit according to Example 1.

FIG. 3 illustrates a section of the sub electronic dial unit 73 in Example 1. The sub electronic dial unit 73 includes a dial 302, a click plate 303, the unillustrated click mechanism, a first flexible substrate (first flexible printed circuit: first FPC) 305, a second flexible substrate (second FPC) 306, a rotation detection contact piece 307, a capacitance detector (capacitance detector) 305a, and a signal transfer contact piece (signal transfer unit) 308.

The dial 302 that is an operation member is formed of a resin material and includes a shaft portion 302a and an outer circumferential surface 302b as a side surface. The resin material of the dial 302 may contain glass fiber or the like for intensity improvement but may contain no conductive material such as carbon.

The shaft portion 302a of the dial 302 is inserted from above into a hole provided through an upper surface part of an upper cover 301 of the camera 100, and the click plate 303 is fixed at a lower end of the shaft portion 302a by a screw 304. Accordingly, the dial 302 and the click plate 303 are rotatably attached to the upper cover 301. The user can perform a rotational operation onto the dial 302 by applying rotational force to the outer circumferential surface 302b of the dial 302 with a finger.

The click plate 303 is formed of a metal such as stainless steel or a resin material such as polyacetal resin (POM) in a circular plate shape, and unillustrated concave and convex parts are alternately formed on its outer peripheral part in the circumferential direction. In a case where the dial 302 is not rotating, a ball of the click mechanism is pressed by a spring and fitted into one concave part. As the dial 302 rotates and the click plate 303 rotates integrally with the dial 302, the ball moves over the convex part and is fitted into the next concave part. Accordingly, a click feeling is provided to the user. However, click sound is generated as described above.

The second flexible substrate (rotation detection substrate) 306 is fixed at a position facing the click plate 303 on a bottom surface part of the upper cover 301. The rotation detection contact piece 307 that is a conductive member for detecting rotation of the dial 302 is fixed to the click plate 303. An unillustrated plurality of rotation detection conductive patterns that the rotation detection contact piece 307 can contact is formed of copper or the like on the second flexible substrate 306. A rotational (operation) detector includes the rotation detection contact piece 307 and the rotation detection conductive patterns. In other words, (part of) the rotational (operation) detector is provided on the second flexible substrate 306.

As the click plate 303 rotates together with the dial 302, the rotation detection contact piece 307 becomes a contact (conduction) state or a non-contact (non-conduction) state with the plurality of rotation detection conductive patterns at mutually different timings. The camera control unit 50 detects rotation of the dial 302 and the rotational direction thereof based on change in combination of the contact and non-contact states, and changes a setting value in accordance with the rotation detection.

A photo sensor (interrupter (PI) or photo reflector (PR)) configured to switch, in accordance with rotation of the dial 302 (click plate 303), a state in which light from a light emitting unit is received by a light receiving unit and a state in which the light is not received may be used as a rotation detector. The rotational direction of the dial 302 can be detected by using a plurality of PIs or PRs and differentiating timings at which the PIs or PRs become a light receiving state or a non-light receiving state. In this case, the PIs or PRs are provided on the second flexible substrate 306.

The rotational amount (rotational position) of the dial 302 may be detected and, for example, the above-described modes may be switched in accordance with the rotational position of the dial 302.

The first flexible substrate 305 is fixed inside the dial 302. The first flexible substrate 305 is provided with a capacitance detector 305a fixed to the inner circumferential surface (surface on the back side of the outer circumferential surface 302b) 302c of the dial 302. The capacitance detector 305a is a touch sensor configured to detect capacitance change as the outer circumferential surface 302b of the dial 302 is touched with a finger of the user.

A signal transfer contact piece 308 that is fixed to the dial 302 and integrally rotates with the dial 302 is connected to a wiring portion (or pattern) 305*b* connected to the capacitance detector 305*a* on the first flexible substrate 305. The signal transfer contact piece 308 contacts a signal transfer conductive pattern on the second flexible substrate 306 irrespective of the rotational position of the dial 302. Accordingly, the capacitance signal from the capacitance detector 305*a* is transferred to the signal transfer conductive pattern on the second flexible substrate 306 through the signal transfer contact piece 308 and input to the touch operation microcomputer 82*a* through the second flexible substrate 306. For example, the camera control unit 50 changes various setting values in accordance with the kind of a touch operation determined by the touch operation microcomputer 82*a*.

In this manner, the capacitance signal output from the capacitance detector 305*a* of the rotating dial 302 can be transferred to the touch operation microcomputer 82*a* through the second flexible substrate 306 provided with the rotation detection conductive patterns.

The shaft portion 302*a* of the dial 302 may be provided with a wiring pattern through which the capacitance signal from the capacitance detector 305*a* is transferred from the first flexible substrate 305 to the rotation detection contact piece 307 provided at the click plate 303. In this case, the capacitance signal from the capacitance detector 305*a* can be transferred to the second flexible substrate 306 through the rotation detection contact piece 307 serving as a rotation detector (part thereof) and a signal transfer unit and can be input to the touch operation microcomputer 82*a*. Alternatively, a non-contact communication unit of wireless communication, optical communication, or the like may be used as the signal transfer unit to transfer the capacitance signal from the capacitance detector 305*a* to the second flexible substrate 306 and input the capacitance signal to the touch operation microcomputer 82*a*.

Figures 4A, 4B:
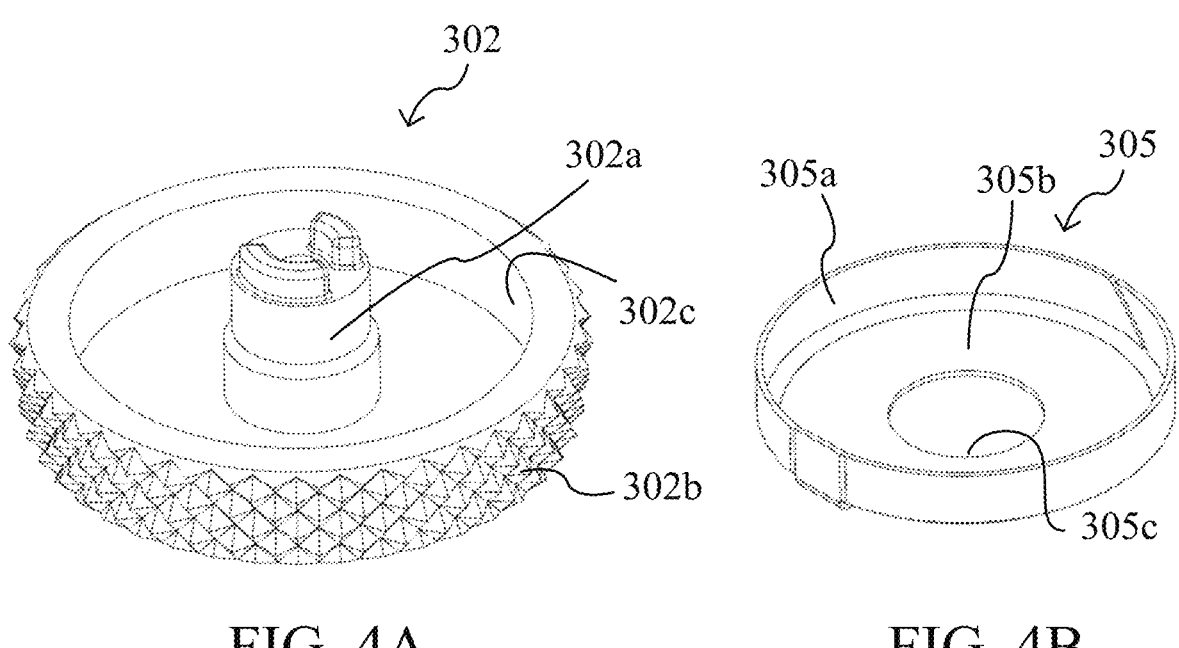
FIGS. 4A, 4B, and 4C are diagrams illustrating a dial and a first flexible substrate (FPC) in Example 1.

FIG. 4A only illustrates the dial 302 when viewed from its bottom surface side. The inside of the dial 302 is a concave part that is opened on the bottom surface side, the shaft portion 302*a* is provided at the center of the concave part, and a cylindrical part is formed around the concave part. The outer circumferential surface of the cylindrical part is the outer circumferential surface 302*b*, and the inner circumferential surface thereof is the inner circumferential surface 302*c*. The outer circumferential surface 302*b* has a minute web-like irregular (knurled) shape for preventing slipping of a finger of the user.

FIG. 4B only illustrates the first flexible substrate 305 when viewed from the bottom surface side. The first flexible substrate 305 has a shape in which the capacitance detector 305*a* is provided around a wiring portion 305*b* in a ring shape.

Figure 4C:
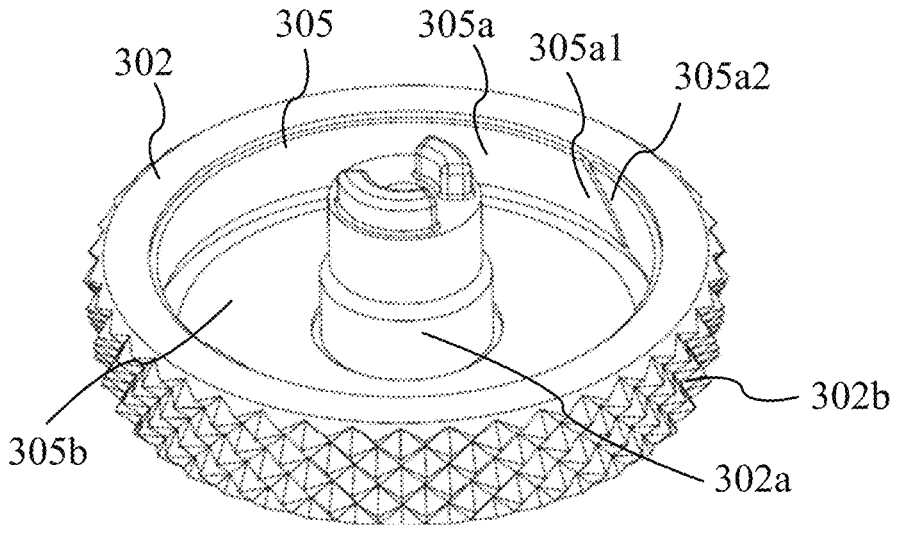

FIG. 4C illustrates a state in which the first flexible substrate 305 is fixed inside the dial 302 by, for example, a double-sided adhesive tape, a bonding agent, or fitting of a protrusion and a protrusion hole. The shaft portion 302*a* of the dial 302 is inserted into an opening 305*c* formed at the center of the wiring portion 305*b* of the first flexible substrate 305, the wiring portion 305*b* is bonded to a ceiling surface inside the dial 302, and the capacitance detector 305*a* is bonded to the entire circumference of the inner circumferential surface 302*c* of the dial 302.

The vicinity of an one end 305*a*1 of the capacitance detector 305*a* in the circumferential direction and the vicinity of the other end 305*a*2 thereof may overlap each other. Although not illustrated in FIGS. 4B and 4C, the signal transfer contact piece 308 that is a conductive member for transferring the capacitance signal from the capacitance detector 305*a* to the second flexible substrate 306 as described above with reference to FIG. 3 is provided at the wiring portion 305*b*.

Instead of the configuration in which the dial 302 is fixed to the first flexible substrate 305 separately provided from the dial 302, the capacitance detector 305*a* and the wiring portion 305*b* may be integrally shaped with the dial 302. In any case, the capacitance detector 305*a* only needs to contact the inner circumferential surface 302*c* on the back side of the outer circumferential surface 302*b* of the dial 302 directly or through a conductive double-sided adhesive tape or conductive grease that is a conductive member such that no clearance including an air layer is formed between the inner circumferential surface 302*c* of the dial 302 and the capacitance detector 305*a*. No air layer formed can prevent capacitance signal variance and S/N decrease in accordance with the way of touch on the outer circumferential surface 302*b* by the user, thereby stably detecting a touch operation.

As illustrated in FIG. 4B, the capacitance detector 305*a* serving as a wiring portion may be provided on the ceiling surface inside the dial 302 to detect a touch operation onto an upper surface (top surface) of the dial 302. Specifically, the capacitance detector may be provided in contact with an inner surface on the back side of the outer surface (the outer circumferential surface 302*b* and the upper surface) of the dial 302 directly or through a conductive double-sided adhesive tape or conductive grease.

Figure 5A:
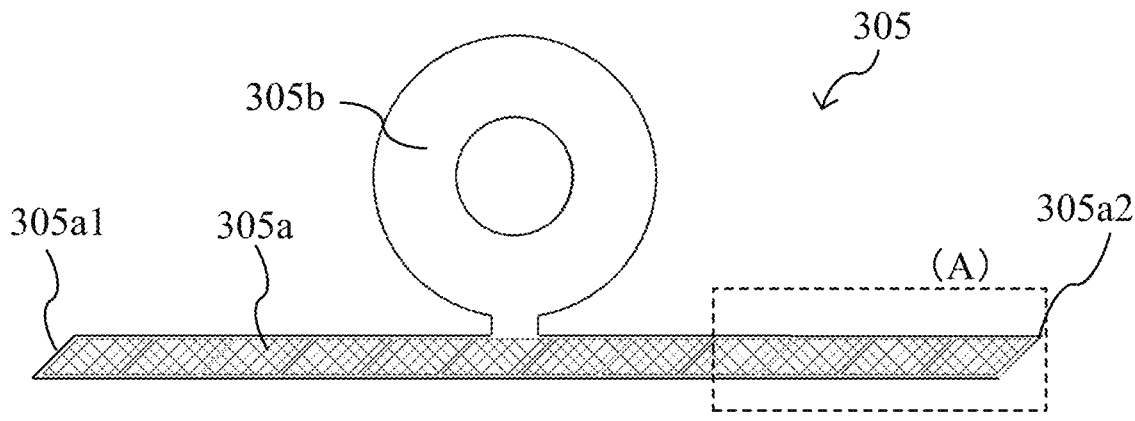
FIGS. 5A and 5B are enlarged views illustrating the first flexible substrate.
Figure 5B:
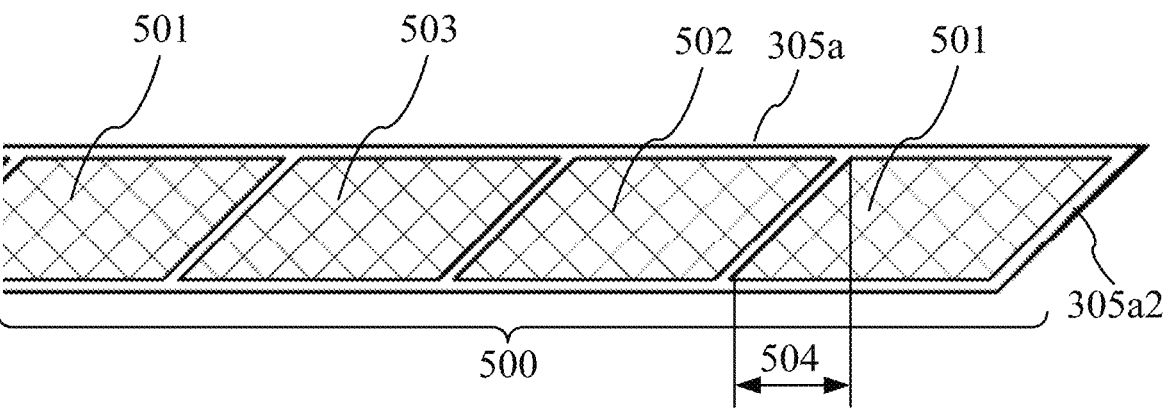

FIG. 5A illustrates the first flexible substrate 305 when exploded in a flat plate shape. FIG. 5B illustrates part A of the capacitance detector 305*a* in FIG. 5A in an enlarging manner. The capacitance detector 305*a* is provided with a touch sensor electrode 500 constituting the above-described dial touch sensor. The touch sensor electrode 500 includes a plurality of (first to third) electrodes 501 to 503 formed of a conductive member such as copper and disposed adjacent to each other at a small interval in a longitudinal direction of the capacitance detector 305*a* (the circumferential direction of the inner circumferential surface 302*c* of the dial 302: hereinafter referred to as a sensor longitudinal direction). The first, second, and third electrodes 501, 502, and 503 are repeatedly disposed in the stated order from the one end 305*a*1 of the capacitance detector 305*a* to the other end 305*a*2 in the sensor longitudinal direction.

As illustrated in FIG. 5B, each of the first to third electrodes 501 to 503 is formed in a shape including a part 504 overlapping an adjacent electrode in the sensor longitudinal direction. Specifically, both ends of each electrode in the sensor longitudinal direction are formed at a tilt in a direction orthogonal to the sensor longitudinal direction. The one end 305*a*1 and the other end 305*a*2 of the capacitance detector are cut along the tilt of both ends of each electrode. With such an electrode shape, the capacitance signal can be stably output wherever a touch operation (tap operation and slide operation) is performed on the outer circumferential surface 302*b* of the dial 302. In particular, this example can avoid discontinuity of the capacitance signal due to the interval between electrodes in a case where a slide operation is performed, thereby improving detection performance of the slide operation.

Figures 6A, 6B:
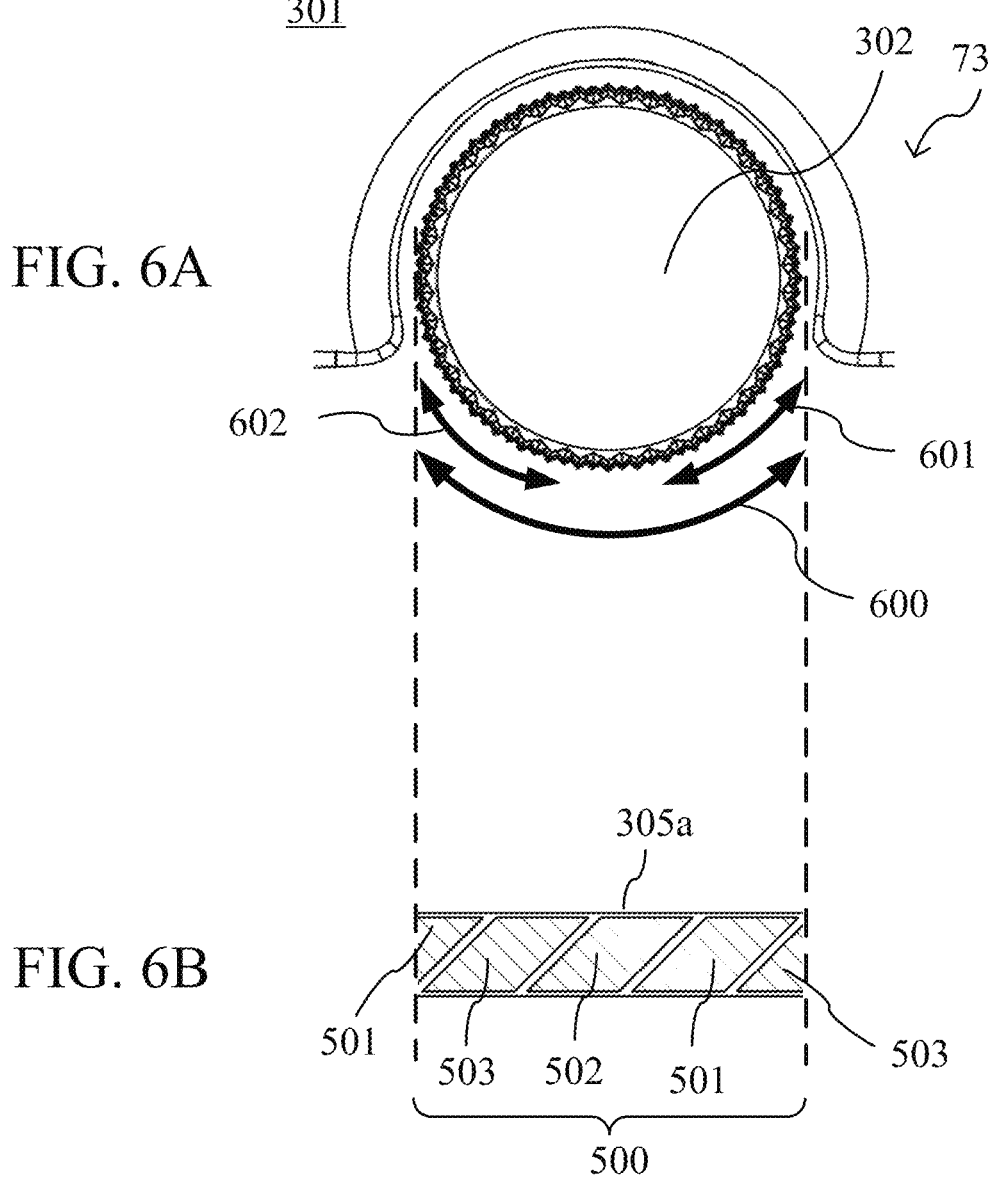
FIGS. 6A and 6B illustrate the positional relation between the sub electronic dial unit and a capacitance detector according to Example 1.

FIG. 6A illustrates the positional relation between the dial 302 and the capacitance detector 305*a* (the touch sensor electrode 500) when viewed from above. As understood from FIGS. 1A and 1B, the dial 302 is disposed in a concave part provided at the upper cover 301, and part of the outer circumferential surface 302*b* of the dial 302 is exposed through an opening 600 on the back surface side of the concave part. The user touches the part (hereinafter referred to as an operable portion) of the outer circumferential surface 302*b* of the dial 302 exposed through the opening 600 with a finger and performs a rotational operation and a touch operation. The operable portion of the dial 302 in this example has an angle range of 120 [degree] approximately about the rotational center of the dial 302. However, the angle range may be 90 [degree] or 180 [degree] and is not particularly limited.

FIG. 6B illustrates the touch sensor electrode 500 provided on the back surface (inner circumferential surface 302*c*) of the operable portion of the dial 302. As illustrated in the diagram, at least one of each of the first to third electrodes 501 to 503 is provided on the back surface of the operable portion of the dial 302. At least one of each of the first to third electrodes 501 to 503 may be provided on the back surface of the operable portion irrespective of the rotational position of the dial 302.

The rotational position of the dial 302 is determined in a case where the above-described ball is fitted into a concave part of the click plate 303. Thus, the concave parts of the click plate 303 are formed at a circumferential direction pitch with which at least one of each of the first to third electrodes 501 to 503 is provided on the back surface of the operable portion of the dial 302. Accordingly, a tap operation and a slide operation onto the dial 302 can be excellently detected as described below.

Tap Operation

A tap operation is an operation of touching the operable portion of the dial 302 with a finger and then removing the finger without changing a touch position (canceling the touch) in a predetermined time. In FIG. 6A, in a case where a finger of the user touches a right tap range 601 of the operable portion of the dial 302, the touch on the right tap range 601 is detected based on capacitance change at the first electrode 501 illustrated in FIG. 6B. Thereafter, in a case where the finger is removed from the right tap range 601 in the predetermined time, the touch cancellation in the right tap range 601 is detected based on capacitance change at the first electrode 501. With such capacitance (signal) change, the touch operation microcomputer 82*a* detects a right tap operation and the camera control unit 50 executes a function (operation or control) allocated to the right tap operation.

In a case where a finger of the user touches a left tap range 602 of the operable portion of the dial 302, the touch on the left tap range 602 is detected based on capacitance change at the third electrode 503. Thereafter, in a case where the finger is removed from the left tap range 602 in the predetermined time, the touch cancellation in the left tap range 602 is detected based on capacitance change at the third electrode 503. With such capacitance change, the touch operation microcomputer 82*a* detects a left tap operation and the camera control unit 50 executes a function allocated to the left tap operation.

A center tap operation using capacitance change at the second electrode 502 may be provided. Moreover, a tap operation may be detected in a case where touch with a finger continues for a first predetermined time or longer after the touch and then the touch is canceled in a second predetermined time.

Slide Operation

A slide operation is an operation of touching the operable portion of the dial 302 with a finger and then moving the finger (touch position) while touching. In a case where a finger of the user touches the right tap range 601 of the operable portion of the dial 302, the touch on the right tap range 601 is detected based on capacitance change (increase) at the first electrode 501. As the finger moves from the right tap range 601 to the left tap range 602 while touching the operable portion, capacitance sequentially changes in the order of the first electrode 501, the second electrode 502, and the third electrode 503, and accordingly, movement of the touch position in the left direction is detected. In a case where the finger is removed from the left tap range 602, the touch cancellation in the left tap range 602 is detected based on capacitance change (decrease) at the third electrode 503. With such capacitance change, the touch operation microcomputer 82*a* detects a left slide operation and the camera control unit 50 executes a function allocated to the left slide operation.

In a case where a finger of the user touches the left tap range 602 of the operable portion of the dial 302, the touch on the left tap range 602 is detected based on capacitance change at the third electrode 503. As the finger moves from the left tap range 602 to the right tap range 601 while touching the operable portion, capacitance sequentially changes in the order of the third electrode 503, the second electrode 502, the first electrode 501, and accordingly, movement of the touch position in the right direction is detected. In a case where the finger is removed from the right tap range 601, the touch cancellation in the right tap range 601 is detected based on capacitance change at the first electrode 501. With such capacitance change, the touch operation microcomputer 82*a* detects a right slide operation and the camera control unit 50 executes a function allocated to the right slide operation.

In a case where movement of the touch position is detected after touch (in other words, even though touch cancellation is not detected), the movement may be detected as a slide operation and a function allocated to the slide operation may be executed.

A position initially touched by a finger in right and left slide operations may be a center range corresponding to the second electrode 502 at the operable portion of the dial 302. In this case, in a case where a finger of the user touches the center range, the touch on the center range is detected based on capacitance change at the second electrode 502, and a left slide operation is detected based on sequential change in capacitance in the order of the second electrode 502 and the third electrode 503 as the finger moves in the left direction. In addition, a right slide operation is detected based on sequential change in capacitance in the order of the second electrode 502 and the first electrode 501 as the finger moves in the right direction after the touch on the center range is detected.

The three electrodes (first to third electrodes) are disposed at the operable portion of the dial in this example, but may be two electrodes or four or more electrodes.

In the above-described sub-electronic dial unit 73, a rotational operation function to detect a rotational operation onto a dial 302 and execute a function in accordance with the rotational operation, and a touch operation function to detect a touch operation and execute a function in accordance with the touch operation may be switched. For example, operation switches or items on a menu screen for selecting the rotational operation function and the touch operation function may be provided and the rotational operation function and the touch operation function may be switched in accordance with a user operation. Alternatively, a camera control unit 50 may determine the state (use state or use environment) of a camera 100 through an attitude detector 55, an eye proximity detector 57, an audio detector 91, and a grip detector 92 illustrated in FIG. 2 and may automatically switch the rotational operation function and the touch operation function in accordance with a result of the determination.

This example can accurately detect a touch operation (tap operation and slide operation) on the dial 302 on which a rotational operation can be performed in the camera 100 having a small size.

EXAMPLE 2

Example 2 will be described below. Disposition of first to third electrodes 501 to 503 at an operable portion of the dial 302 is different depending on the rotational position (phase) of the dial 302. Thus, in a case where a tap operation is performed, it is difficult to determine whether the tap operation is a right tap operation or a left tap operation.

Figure 7A:
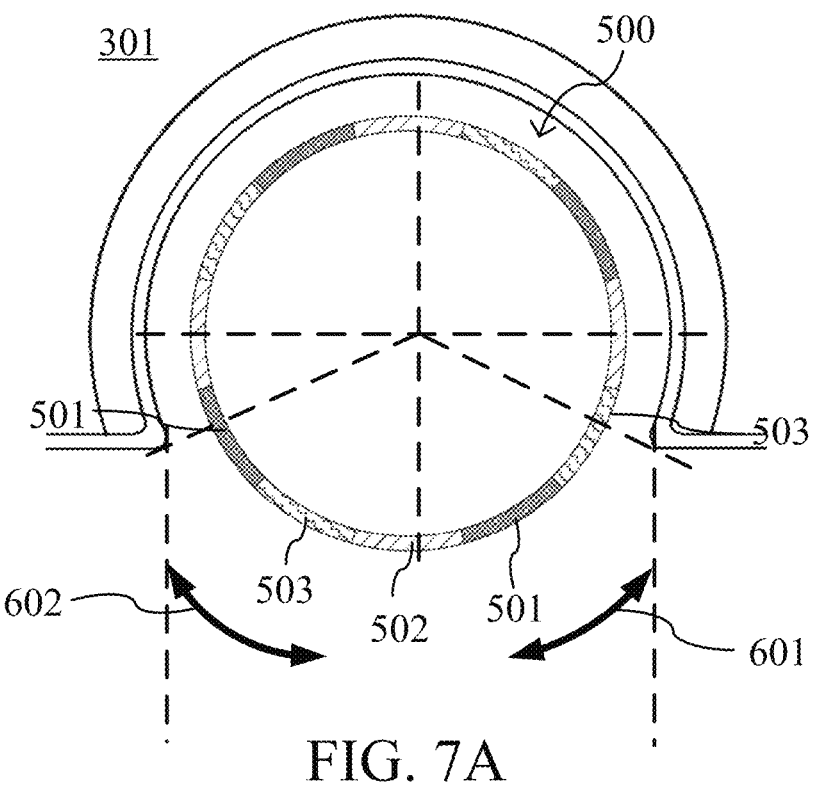
FIGS. 7A and 7B are diagrams for description of a problem solved according to Example 2.
Figure 7B:
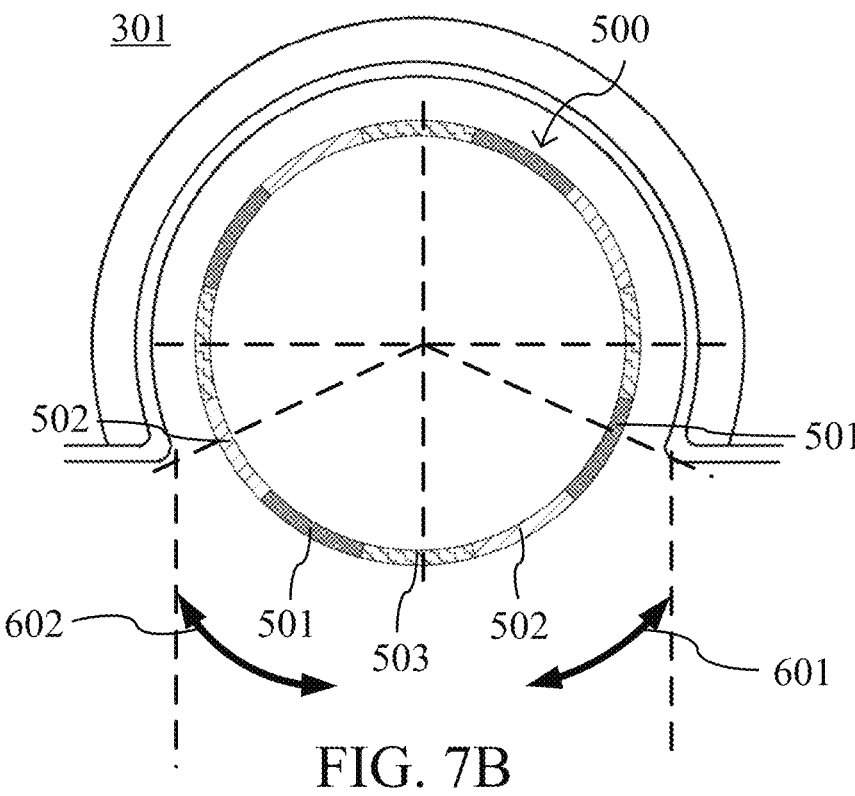

For this description, FIGS. 7A and 7B illustrate the relation between the rotational position of the dial 302 and disposition of touch sensor electrodes 500 (the first to third electrodes 501 to 503) at the operable portion of the dial 302. FIG. 7A illustrates a state in which the dial 302 is at a rotational position where the first electrode 501 and the third electrode 503 are positioned in a right tap range 601 and a left tap range 602, respectively, of the operable portion. FIG. 7B illustrates a state in which the dial 302 is at a rotational position where the second electrode 502 and the first electrode 501 are positioned in the right tap range 601 and the left tap range 602, respectively. In the state illustrated in FIG. 7B, the dial 302 is rotated in the left direction by 60° approximately from the state illustrated FIG. 7A.

For example, in a case where a tap operation is performed on the right tap range 601 at the rotational position of the dial 302 illustrated in FIG. 7A, a right tap operation needs to be determined based on capacitance change at the first electrode 501. In a case where a tap operation is performed on the left tap range 602 at the same rotational position, a left tap operation needs to be determined based on capacitance change at the third electrode 503.

In a case where a tap operation is performed on the right tap range 601 at the rotational position of the dial 302 illustrated in FIG. 7B, a right tap operation needs to be determined based on capacitance change at the second electrode 502. In a case where a tap operation is performed on the left tap range 602 at the same rotational position, a left tap operation needs to be determined based on capacitance change at the first electrode 501.

In this manner, electrodes related to determination of a right tap operation and a left tap operation are different depending on the rotational position of the dial 302. In such a case, a rotational position sensor such as an encoder for detecting the rotational position of the dial 302 may be provided and electrodes related to determination of a right tap operation and a left tap operation may be changed for each rotational position of the dial 302.

However, provision of such a rotational position sensor leads to size increase and cost increase of the sub electronic dial unit 73. Thus, in the present example, no rotational position sensor is provided, and a right tap operation and a left tap operation are determined only with electrode disposition and a determination algorithm (tap operation determination processing).

Figure 8:
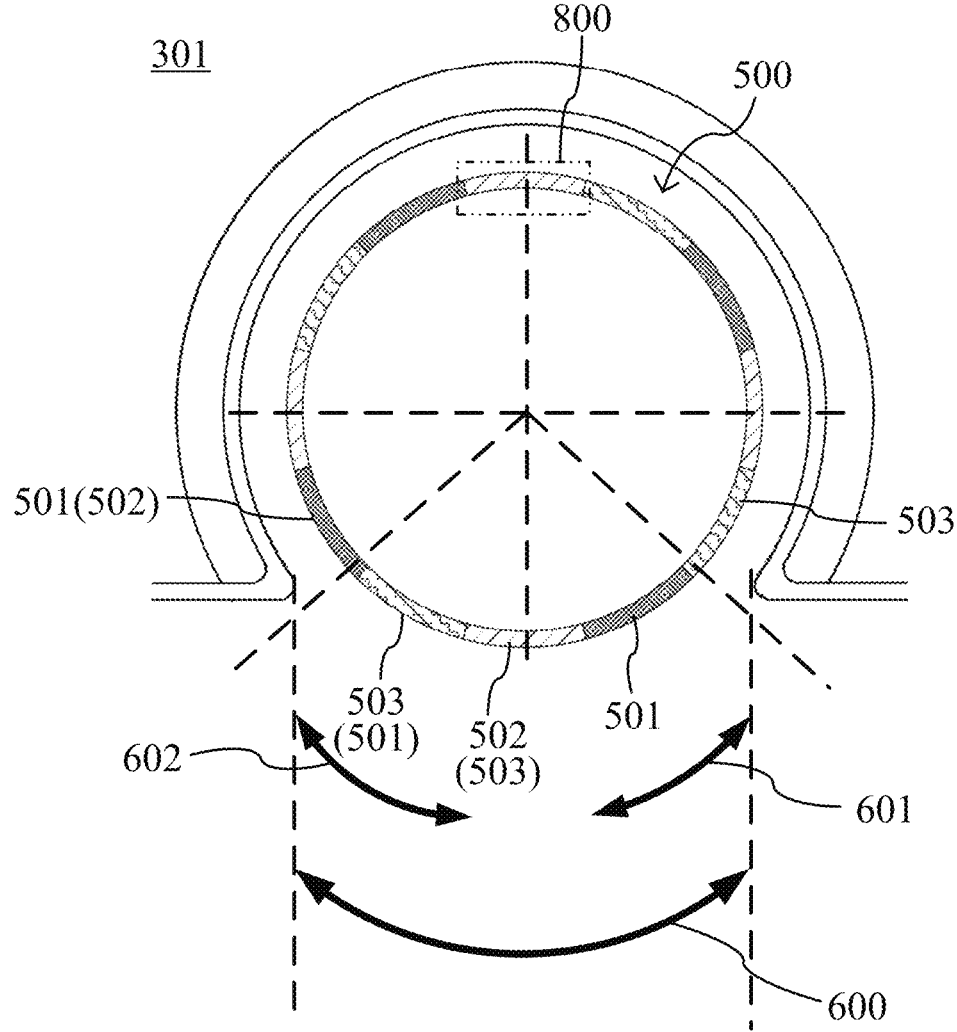
FIG. 8 is a diagram illustrating touch sensor electrodes in Example 2.

FIG. 8 illustrates disposition of the touch sensor electrodes 500 (first to third electrodes 501 to 503) in the present example. The operable portion (exposed part from an opening 600) of the dial 302 in FIG. 8 has an angle range of 90° approximately. However, the operable portion may have any other angle range.

As described above, a slide operation is performed as a user touches the operable portion of the dial 302 (exposed part from the opening 600) with a finger and moves the finger in the left direction or the right direction. For the slide operation, a left slide operation and a right slide operation can be determined as long as the operable portion includes at least three electrodes 501 to 503 as illustrated in FIG. 3. Specifically, capacitance changes at the first electrode 501 in a case where the finger touches the right tap range 601, and then capacitance sequentially changes in the order of the first, second, and third electrodes 501, 502, and 503 as the finger moves toward the left tap range 602. Thereafter, capacitance changes at the third electrode 503 in a case where the finger is removed from the left tap range 602. Accordingly, a left slide operation is determined. Similarly, capacitance changes at the third electrode 503 in a case where the finger touches the left tap range 602, and then capacitance sequentially changes in the order of the third, second, and first electrodes 503, 502, and 501 as the finger moves toward the right tap range 601. Thereafter, capacitance changes at the first electrode 501 in a case where the finger is removed from the right tap range 601. Accordingly, a right slide operation is determined.

In FIG. 8, the entire first electrode 501 and part (half) of the second electrode 502 to the left are disposed in the right tap range 601. The third electrode 503 to the right of the first electrode 501 is entirely or mostly out of the right tap range 601. The entire third electrode 503 and part of the second electrode 502 to the right are disposed in the left tap range 602. The first electrode 501 to the left of the third electrode 503 is entirely or mostly out of the left tap range 602.

Figure 9:
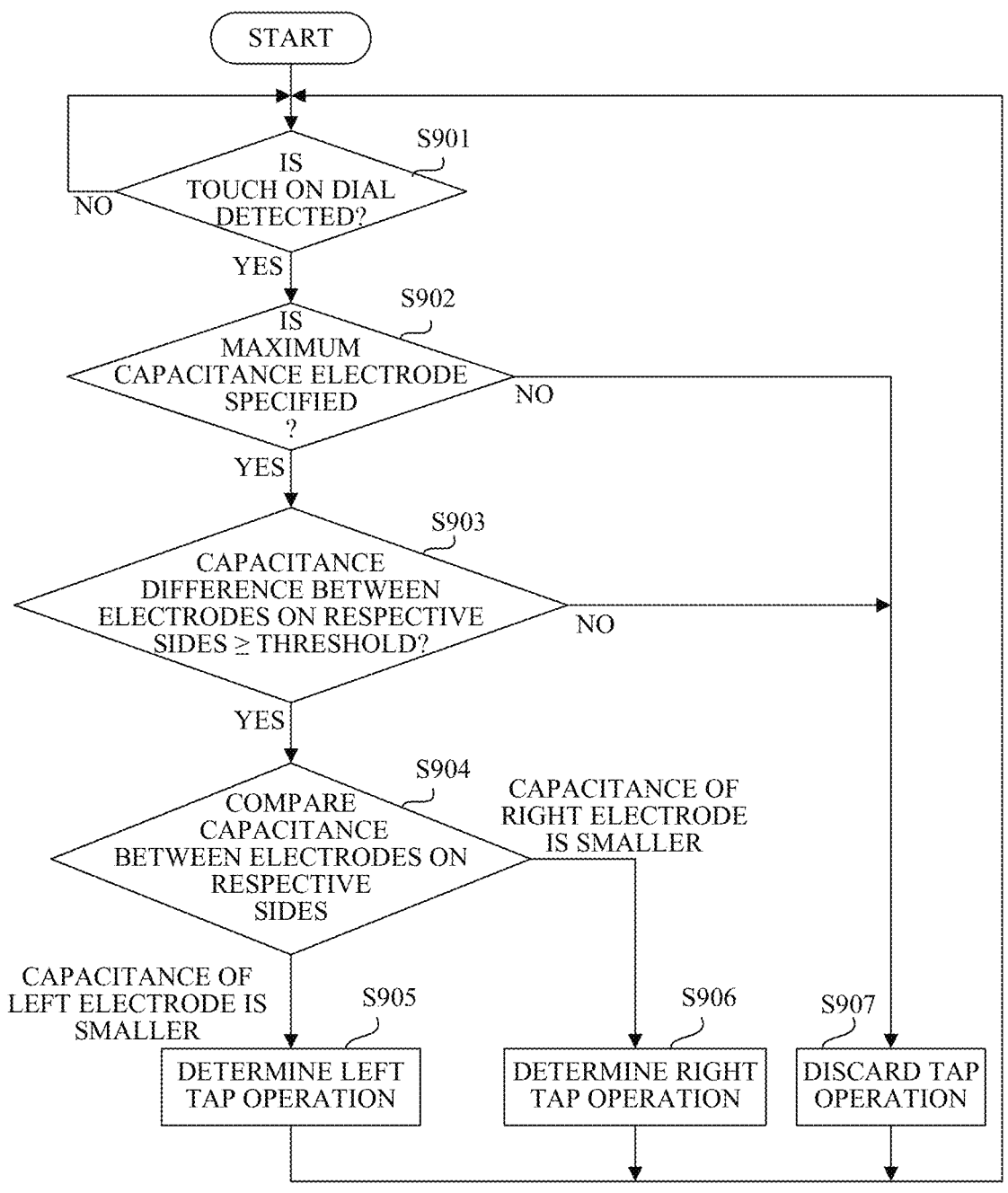
FIG. 9 is a flowchart illustrating tap operation determination processing in Example 2.

FIG. 9 illustrates a flowchart of the tap operation determination processing executed by a touch operation microcomputer 82a in the present example. The touch operation microcomputer 82a as a computer executes the present processing based on a computer program. The following description will be made on a case where one of each of the first to third electrodes 501 to 503 is disposed at the operable portion of the dial 302 as illustrated in FIG. 8. However, the disposition order of the first to third electrodes 501 to 503 at the operable portion (that is, the rotational position of the dial 302) is not limited to that illustrated in FIG. 8.

At step S901, the touch operation microcomputer 82a determines whether capacitance changes at any of the first to third electrodes 501 to 503 and a tap operation is detected. The touch operation microcomputer 82a proceeds to step S902 in a case where a tap operation is detected, or repeats the processing at step S901 in a case where no tap operation is detected.

At step S902, the touch operation microcomputer 82a determines whether one electrode (hereinafter referred to as a maximum capacitance electrode) having maximum capacitance among the first to third electrodes 501 to 503 is specified. In a case where the specification is successful, the touch operation microcomputer 82a proceeds to step S903. The following description will be made with an example in which the first electrode 501 is specified as the maximum capacitance electrode.

In a case where there are a plurality of maximum capacitance electrodes and one maximum capacitance electrode cannot be specified, a false operation is potentially performed and thus the touch operation microcomputer 82a proceeds to step S907 and discards the current tap operation. Specifically, for example, the user touches a part including the boundary between the first electrode 501 and the second electrode 502 in the right tap range 601, and accordingly, capacitance is maximum at both the first electrode 501 and the second electrode 502. In this case, a right tap operation and a left tap operation cannot be determined in subsequent processing, and thus the current tap operation is discarded. Furthermore, in a case where the user wrongly touches the entire operable portion of the dial 302, as well, one maximum capacitance electrode cannot be specified, and thus the current tap operation is discarded.

At step S903, the touch operation microcomputer 82*a* calculates capacitance difference between the second electrode 502 and the third electrode 503 on the respective sides of the first electrode 501 specified as a maximum capacitance electrode. Then, the touch operation microcomputer 82*a* determines whether the capacitance difference between the second electrode 502 and the third electrode 503 is equal to or larger than a threshold (equal to or larger than a predetermined value). In a case where the capacitance difference is equal to or larger than the threshold, the touch operation microcomputer 82*a* proceeds to step S904. In a case where the capacitance difference is smaller than the threshold, the touch operation microcomputer 82*a* proceeds to step S907 to discard the current touch operation and then returns to step S901.

At step S904, the touch operation microcomputer 82*a* compares capacitance between the second electrode 502 and the third electrode 503 on the respective sides of the first electrode 501 specified as the maximum capacitance electrode. In a case where the capacitance of the second electrode (second adjacent electrode) 502 to the left of the first electrode 501 is smaller than the capacitance of the third electrode (first adjacent electrode) 503 to the right, the touch operation microcomputer 82*a* proceeds to step S905 to determine the current tap operation as a left tap operation and then returns to step S901. In a case where the capacitance of the third electrode 503 to the right of the first electrode 501 is smaller than the capacitance of the second electrode 502 to the left, the touch operation microcomputer 82*a* proceeds to step S906 to determine the current tap operation as a right tap operation and then returns to step S901. Such determination of right and left tap operations is performed on the following grounds.

In FIG. 8, the third electrode 503 to the right of the first electrode 501 included in the right tap range 601 of the operable portion of the dial 302 is mostly not included in the right tap range 601. Similarly, the first electrode 501 to the left of the third electrode 503 included in the left tap range 602 is mostly not included in the left tap range 602. An electrode mostly not included in the right tap range 601 and the left tap range 602 does not approach a finger of the user, and accordingly, the capacitance thereof is smaller than that of the second electrode 502 included in the right tap range 601 and the left tap range 602. Thus, in a case where a finger touches the right tap range 601 and the left tap range 602, the capacitance of one of electrodes on the respective sides of an electrode entirely included in the tap ranges is inevitably smaller than the capacitance of the other electrode. In the present example, a right tap operation and a left tap operation are determined by using such a capacitance difference between electrodes.

In a case where the first electrode 501 as the maximum capacitance electrode is positioned in the right tap range 601 as illustrated in FIG. 8, a right tap operation is determined in a case where the capacitance of the third electrode 503 to the right is smaller than the capacitance of the second electrode 502 to the left (step S906). In a case where the first electrode 501 as the maximum capacitance electrode is positioned in the left tap range 602 as illustrated in parentheses in FIG. 8, a left tap operation is determined in a case where the capacitance of the second electrode 502 to the left is smaller than the capacitance of the third electrode 503 to the right (step S905).

The capacitance difference between electrodes on the respective sides of the maximum capacitance electrode is calculated and compared with the threshold at step at S903 in FIG. 9 for the following reason. As described above, the capacitance of an electrode mostly not included in the right tap range 601 and the left tap range 602 is smaller than the capacitance of an electrode included in the right tap range 601 and the left tap range 602, and the capacitance difference between these electrodes is large.

In a case where a finger of the user touches the right tap range 601 while the dial 302 is at the rotational position illustrated in FIG. 8, the capacitance difference between the capacitance of the second electrode 502, which is partially included in the right tap range 601 and the finger approaches, and the third electrode 503, which the finger does not approach, becomes equal to or larger than the threshold. In a case where a finger touches the left tap range 602 while the dial 302 is at a rotational position of the electrode disposition illustrated in parentheses in FIG. 8, the capacitance difference between the capacitance of the third electrode 503, which is partially included in the left tap range 602 and the finger approaches, and the second electrode 502, which the finger does not approach, becomes equal to or larger than the threshold. In the present example, a right tap operation or a left tap operation is detected upon detection of such a capacitance difference larger than the threshold. Whether the detected tap operation is a right tap operation or a left tap operation is determined at the subsequent step S904.

In a case where a finger of the user touches between the right tap range 601 and the left tap range 602 at the rotational position of the dial 302 illustrated in FIG. 8, the second electrode 502 is specified as the maximum capacitance electrode and the capacitance difference between the first electrode 501 and the third electrode 503 on the respective sides of the second electrode 502 is calculated. Since the first electrode 501 and the third electrode 503 on the respective sides are both included in the operable portion of the dial 302, capacitance is equivalent between the first electrode 501 and the third electrode 503. In this case, the capacitance difference between the first electrode 501 and the third electrode 503 is smaller than the threshold, and thus it is determined that the current tap operation is not a right tap operation nor a left tap operation, and the current tap operation is discarded.

A center tap range may be set between the right tap range 601 and the left tap range 602. In this case, a tap operation onto the center tap range (center tap operation) may be determined in a case where the maximum capacitance electrode can be specified and the capacitance difference between electrodes on the respective sides of the maximum capacitance electrode is smaller than the threshold (capacitance is equivalent between the electrodes).

In this manner, it is possible to determine which of right and left tap operations is performed, or a center tap operation different from right and left tap operations, by calculating the capacitance difference between electrodes on the respective sides of the maximum capacitance electrode and comparing the capacitance difference with the threshold.

Although the present example describes a case where right and left tap operations are determined based on electrode disposition and the determination algorithm as described above, a rotational position sensor configured to detect the rotational position of the dial 302 may be used as long as increase size and cost increase are avoided. In this case, the touch operation microcomputer 82a sets, as a reference, for example, disposition of the first to third electrodes 501 to 503 at the operable portion of the dial 302 at power-on of the camera 100. Then, the touch operation microcomputer 82a recognizes change in disposition of the first to third electrodes 501 to 503 at the operable portion in accordance with the rotational direction and rotational amount of the dial 302, which are detected by the rotational position sensor thereafter. Accordingly, the touch operation microcomputer 82a can determine which tap range a tap operation is performed in based on capacitance change at electrodes corresponding to the right and left tap ranges as well as the center tap range.

EXAMPLE 3

Example 3 will be described below. In Example 1, a knurled shape for preventing finger slipping is provided on the entire outer circumferential surface 302b of the dial 302, and thus a slide operation onto the outer circumferential surface 302b potentially cannot be smoothly performed.

Figure 10:
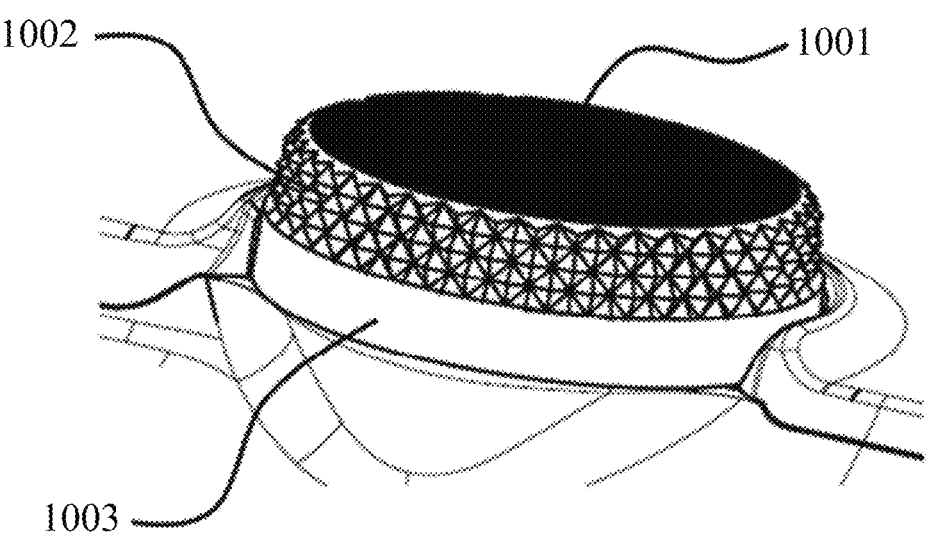
FIG. 10 is a perspective view illustrating a dial in Example 3.

To solve this problem, the outer circumferential surface of a dial 1001 of Example 3 illustrated in FIG. 10 is divided into two regions on the upper and lower sides: a knurled shape is formed as in Example 1 in an upper region (first region) 1002, and a smooth surface is formed in a lower region (second region) 1003. The outer diameter of the lower region 1003 is larger than the outer diameter of the upper region 1002.

The user puts a finger on the upper region 1002 in performing a rotational operation onto the dial 1001. Since slipping of the finger is prevented by the knurled shape of the upper region 1002, the rotational operation can be easily performed. The user touches the lower region 1003 with a finger in performing a slide operation onto the outer circumferential surface of the dial 1001. Since the lower region 1003 is provided with a smooth surface and smoother than the upper region, slipping of the finger in the slide operation is not disturbed and the slide operation can be smoothly performed. A tap operation may be performed on any of the upper region 1002 and the lower region 1003.

In this manner, the dial 1001 of the present example can improve both rotational operability and slide operability for the user.

A knurled shape may be provided in the lower region of the dial, and a smooth surface may be provided in the upper region thereof. For example, in a case where the dial sufficiently protrudes from the back surface of a camera, the outer circumferential surface of the dial can be easily touched by a finger from the back surface side of the camera, and thus a knurled shape may be provided in the lower region. In this case, since the smooth surface on which a slide operation is performed is disposed in the upper region, the size of a flexible substrate including a capacitance detector can be reduced.

In the present example, the shapes of the upper region and the lower region are differentiated to improve rotational operability and slide operability, but the materials of the upper region and the lower region may be differentiated. Specifically, rotational operability and slide operability may be improved by using a material that prevents finger slipping with large friction, such as rubber, in a region where a finger is placed in a case where a rotational operation is performed, and by using a material that facilitates finger slipping with small friction in a region where a finger touches in a case where a slide operation is performed.

Modification

Figure 11:
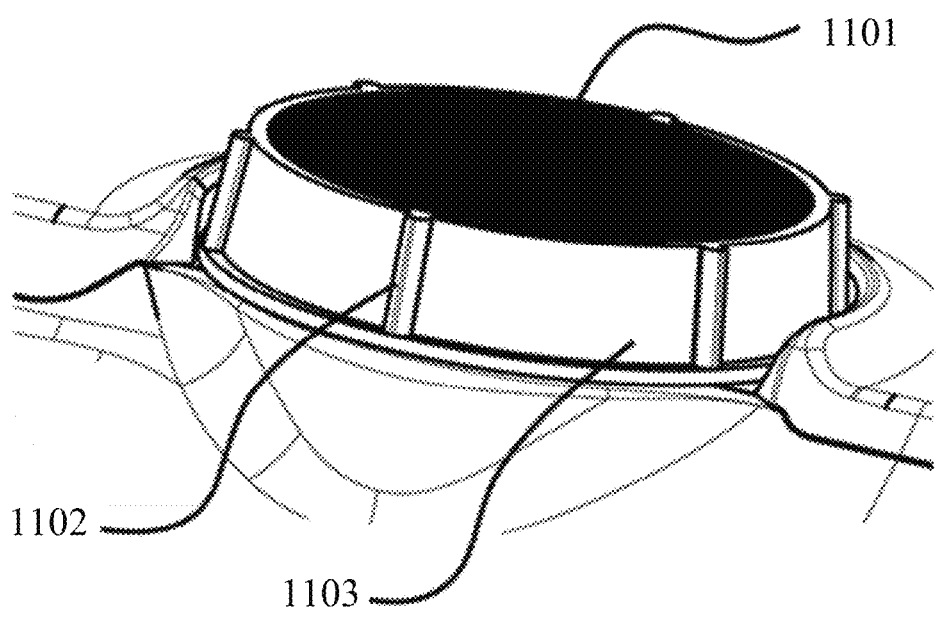
FIG. 11 is a perspective view illustrating a dial as a modification of Example 3.
Figure 12:
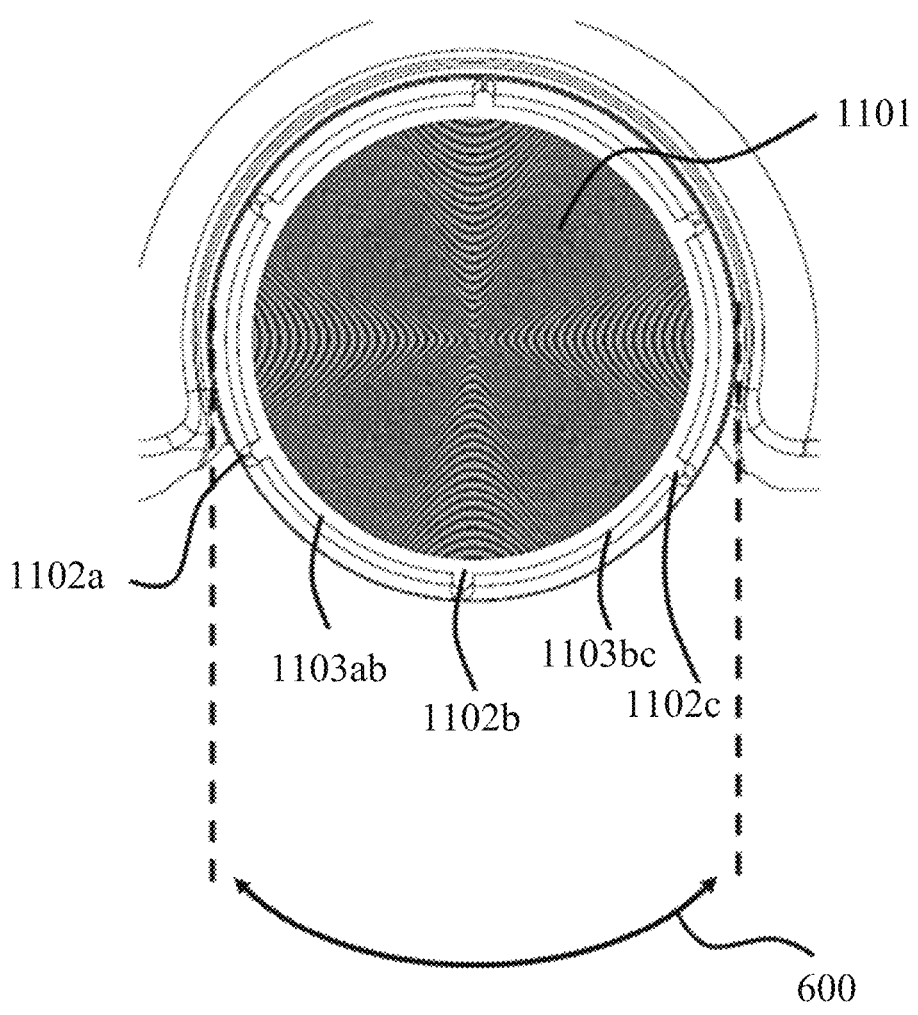
FIG. 12 is a top view of the dial of the modification.

FIGS. 11 and 12 illustrates a dial 1101 as a modification of Example 3. A plurality (six) of protrusions 1102 are formed on the outer circumferential surface of the dial 1101 at equal intervals in the circumferential direction, and smooth surfaces 1103 are formed between the protrusions 1102.

As illustrated in FIG. 12, part (operable portion) of the outer circumferential surface of the dial 1101 is exposed from the opening 600 of a concave part of an upper cover 301 as in Example 1. The operable portion has an angle range slightly larger than 120° about the rotation center of the dial 1101. The operable portion includes three protrusions 1102a, 1102b, and 1102c and two smooth surfaces 1103ab and 1103bc therebetween. The smooth surfaces 1103ab and 1103bc each have a circumferential length sufficient for a slide operation and are smooth enough for a slide operation to be smoothly performed. In a case where a rotational operation is performed on the dial 1101, a finger can be put on the protrusions 1102a, 1102b, and 1102c and thus the rotational operation can be easily performed.

Figure 13:
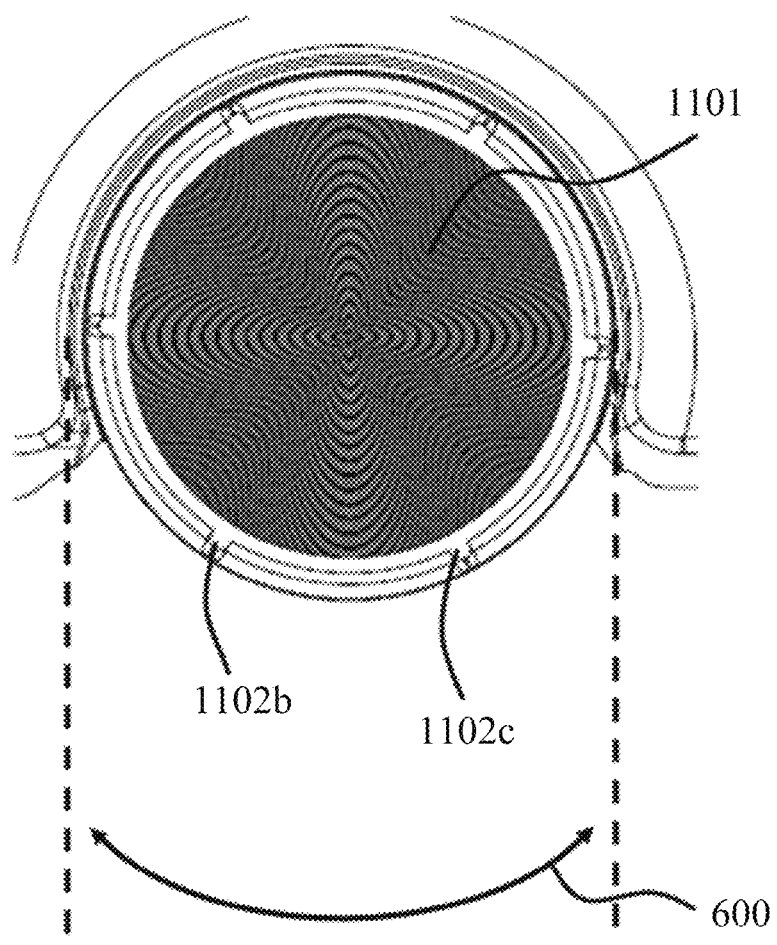
FIG. 13 is a top view illustrating the dial rotated from a state in FIG. 12.

FIG. 13 illustrates a state in which the dial 1101 is rotated in the left direction (clockwise direction) by one click from the rotational position in FIG. 12. In the present modification, a conductive pattern that a rotation detection contact piece 307 illustrated in FIG. 3 contacts on a second flexible substrate 306 is switched each time the dial 1101 rotates by 30°. With this configuration, rotation of the dial 1101 is detected. Concave parts into which a ball is fitted are formed at a click plate 303 so that a click feeling is given to the user at each rotation detection interval of 30°.

In a case where the dial 1101 is rotated in the clockwise direction by one click(30°) from the rotational position in FIG. 12, only the protrusions 1102b and 1102c are included in the operable portion as illustrated in FIG. 13. In this manner, the dial 1101 stops in a state in which the protrusions 1102 are disposed at the positions illustrated in FIG. 12 or 13. In both states illustrated in FIGS. 12 and 13, the protrusions 1102 are included in the operable portion, and thus the user can put a finger on the protrusions 1102 and perform a rotational operation by at least one click in any of the clockwise direction and the anticlockwise direction.

The dial 1101 of the present modification can improve both rotational operability and slide operability for the user.

Although the electronic dial unit provided in the camera 100 is described above in each example, an electronic dial unit having the same configuration is applicable to various electronic apparatuses such as an automobile, an audio instrument, and a medical instrument. For example, with an electronic dial unit mounted on an automobile, vehicle speed and inter-vehicular distance in cruise control or temperature and air volume in automatic air conditioning can be set through a rotational operation and a touch operation onto a dial. With an electronic dial unit mounted on an audio instrument, sound volume can be roughly and finely adjusted through a rotational operation and a touch operation onto a dial.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a small-sized electronic apparatus capable of accurately detecting a touch operation onto an operation member on which a rotational operation can be performed.

What is claimed is:

1. An electronic apparatus comprising:
an operation member that is rotationally operable;
a rotation detection substrate provided with a rotation detector configured to detect rotation of the operation member;
a capacitance detector provided inside the operation member and configured to output a detection signal in accordance with capacitance;
a signal transfer unit configured to transfer the detection signal to the rotation detection substrate; and
a touch operation detector to which the detection signal is input through the rotation detection substrate, the touch operation detector being configured to detect a tap operation and a slide operation as a touch operation onto an outer surface of the operation member based on change in the detection signal due to the touch operation;
wherein part of the operation member is an operable portion capable of the touch operation onto the outer surface, and the capacitance detector provided inside the operable portion includes a plurality of electrodes adjacent to each other, and
wherein the touch operation detector
compares capacitance of a first adjacent electrode and capacitance of a second adjacent electrode, the first adjacent electrode being provided adjacent on a first side of an electrode having maximum capacitance among the plurality of electrodes, the second adjacent electrode being adjacently provided on a second side opposite the first side, and
detects the tap operation onto a range on the first side of the operable portion in a case where the capacitance of the first adjacent electrode is smaller than the capacitance of the second adjacent electrode, and detects the tap operation onto a range on the second side of the operable portion in a case where the capacitance of the second adjacent electrode is smaller than the capacitance of the first adjacent electrode.

2. The electronic apparatus according to claim 1, wherein the capacitance detector is provided in contact with, directly or through a conductive member, an inner surface of the operation member on a back side of the outer surface.

3. The electronic apparatus according to claim 1, further comprising a flexible substrate including the capacitance detector and disposed inside the operation member,
wherein the signal transfer unit transfers the detection signal from the flexible substrate to the rotation detection substrate.

4. The electronic apparatus according to claim 1, wherein in the operation member,
the outer surface is an outer circumferential surface about a rotation center of the operation member, and
the capacitance detector is disposed along an inner circumferential surface on a back side of the outer circumferential surface.

5. The electronic apparatus according to claim 1, wherein the rotation detector is a conductive pattern that a conductive member configured to rotate together with the operation member contacts, or is a sensor configured to detect the rotation of the operation member in a non-contact manner.

6. The electronic apparatus according to claim 1, wherein the signal transfer unit is a conductive member that contacts a conductive pattern provided on the rotation detection substrate, or is a communication unit configured to perform non-contact communication with the rotation detection substrate.

7. The electronic apparatus according to claim 1,
wherein the touch operation detector detects the slide operation based on sequential change in the detection signal from the plurality of electrodes.

8. The electronic apparatus according to claim 1, wherein the touch operation detector detects the tap operation onto the range on the first side and the range on the second side in a case where a difference between the capacitance of the first adjacent electrode and the capacitance of the second adjacent electrode is equal to or larger than a predetermined value.

9. The electronic apparatus according to claim 1, wherein the touch operation detector detects the tap operation onto a range between the range on the first side and the range on the second side of the operable portion in a case where a difference between the capacitance of the first adjacent electrode and the capacitance of the second adjacent electrode is smaller than a predetermined value.

10. The electronic apparatus according to claim 1, wherein, the outer surface of the operation member includes a first region of a shape or material that prevents slipping of a finger performing a rotational operation onto the operation member, and a second region in which a finger performing the slide operation is more likely to slip than in the first region.

11. The electronic apparatus according to claim 1, wherein the outer surface of the operation member includes a protrusion engageable with a finger performing a rotational operation onto the operation member, and a smooth surface on which a finger performing the slide operation is slidable.

12. The electronic apparatus according to claim 1, further comprising:
an image sensor configured to convert an optical image of an object into an electric signal; and a processing unit configured to generate an image by
using the electric signal from the image sensor.

* * * * *